UNITED STATES PATENT OFFICE 2,432,737

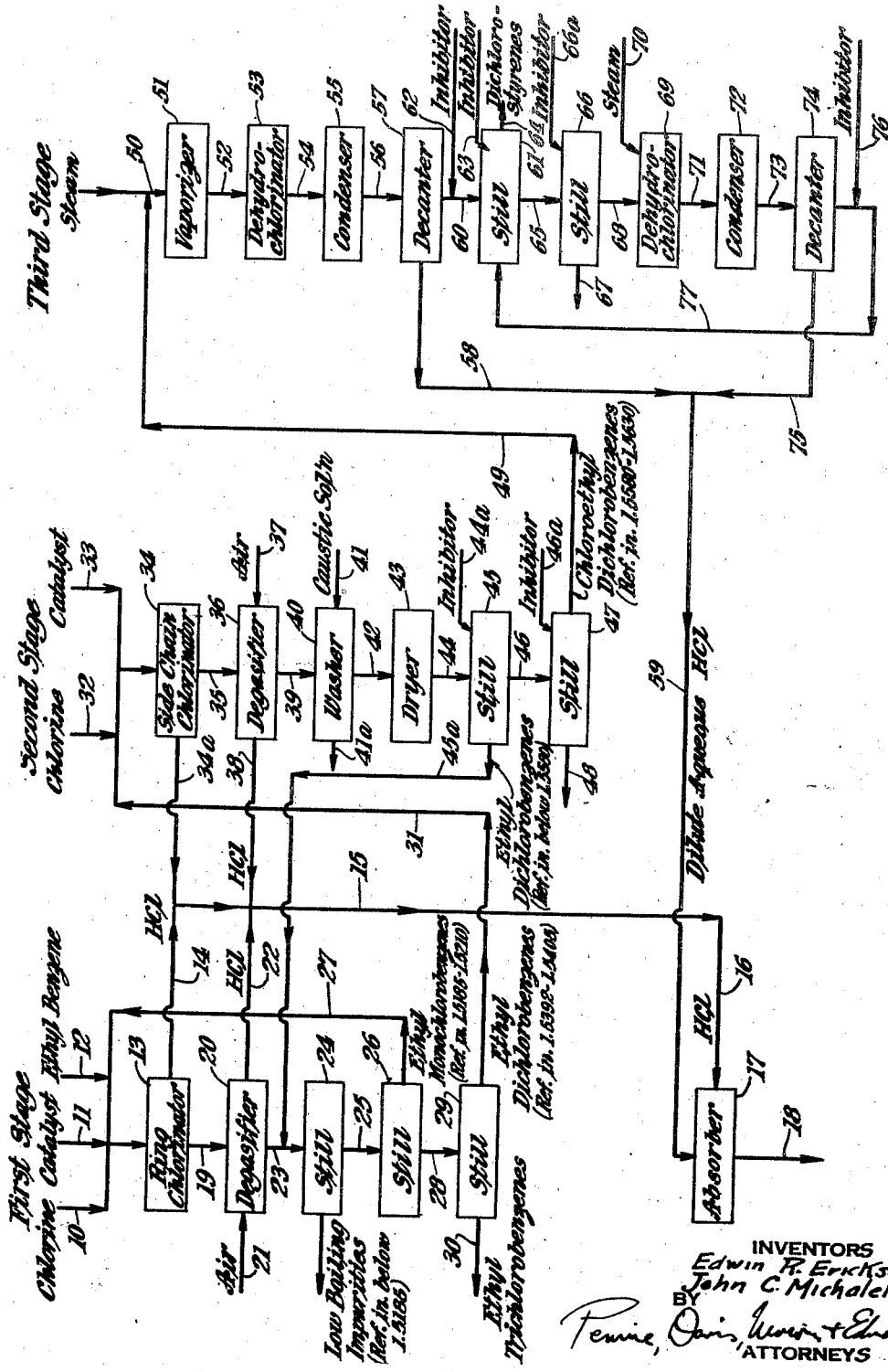

PRODUCTION OF DICHLOROSTYRENES

Edwin R. Erickson and John C. Michalek, Niagara Falls, N. Y., assignors to The Mathieson Alkali Works, Inc., New York, N. Y., a corporation of Virginia Application March 19, 1945, Serial No. 583,482

3 Claims. (Cl. 260—650)

This invention relates to a practical and economical process applicable to the production of the dichlorostyrenes required for the manufacture of the synthetic resins described in copending application Serial No. 395,235, filed May 26, 1941, and the synthetic rubber-like elastomers described in copending application Serial No. 449,475, filed July 2, 1942.

The product of the present process is essentially a mixture of the following isomers, each of which is usually, but not necessarily, present in approximately the proportion indicated:

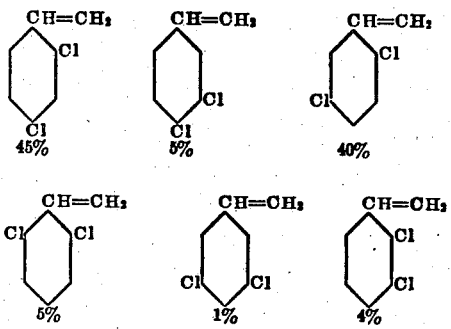

The mixtures as produced according to the invention may be readily polymerized to clear, water-white thermoplastic resins having a high A. S. T. M. distortion temperature (110–125° C.), low moisture absorbency, low dielectric constant and power factor, and other highly desirable properties. By copolymerization with butadiene, piperylene, methyl pentadiene, isoprene and other dienes, rubber-like materials possessing unusually high tensile strength and elasticity at both ordinary and elevated temperatures may be produced. The individual isomers are highly purified materials having a density of from $D_4^{25}=1.236$ to $D_4^{25}=1.280$ and an index of refraction of from $N_D^{25}=1.5724$ to $N_D^{25}=1.5838$.

Our process for producing dichlorostyrenes of the characteristics indicated involves the following major steps or stages:

(1) Chlorination of ethyl benzene to introduce two chlorine atoms into the benzene nucleus;

(2) Chlorination of the resulting ethyl dichlorobenzenes to introduce a third chlorine atom into the side chain, the product of this chlorination being a mixture of alpha and beta chloroethyl dichlorobenzenes;

(3) Dehydrochlorination of the chloroethyl dichlorobenzenes to produce the dichlorostyrenes representing the product of the process.

Each of the above stages embraces a plurality of auxiliary operations having as their purpose the separation of by-products and recovery of incompletely reacted materials for recycling.

The ratio of alpha chloroethyl dichlorobenzenes to beta chloroethyl dichlorobenzenes in the product of the second chlorination may vary within wide limits but is usually of the order of about 5:2. We do not dehydrochlorinate the alpha and beta compounds simultaneously as we have found that the conditions necessary to dehydrochlorinate the beta chloroethyl dichlorobenzenes result in adverse decomposition of the alpha chloroethyl dichlorobenzenes with consequent low yield of the desired dichlorostyrenes. Since we have further found that the conditions required to dehydrochlorinate the alpha compounds are without adverse effect on the beta compounds from the standpoint of their subsequent dehydrochlorination, it is our practice to dehydrochlorinate the alpha compounds in the presence of the beta compounds.

Our process will be described in detail with the help of the accompanying flow diagram.

First stage

Referring to the drawing, chlorine gas, a catalyst such as FeCl₃ or SbCl₃ favoring ring substitution of chlorine, and ethyl benzene are introduced from connections 10, 11, and 12 respectively, into chlorination unit 13. The reaction in this unit is effected in the dark and at a temperature which preferably does not substantially exceed 55° C. HCl produced as a consequence of the reaction is conveyed via connections 14, 15, and 16 to an absorption unit 17 in which it is recovered by absorption in water. Aqueous hydrochloric acid is withdrawn intermittently or continuously from unit 17 via line 18.

Products of the chlorination are passed via line 19 to unit 20 in which additional amounts of HCl are removed by aeration, the required amount of air being admitted via line 21. HCl and air are discharged through line 22 which connects with line 15 as shown.

Degasified chlorination products consisting in the main of ethyl monochlorobenzenes, ethyl dichlorobenzenes, and ethyl trichlorobenzenes are passed through line 23 to a distillation unit 24 in which low boiling impurities are separated as the distillate. The residue from the distillation is passed via line 25 to a second distillation unit 26 for separation of the ethyl monochlorobenzenes as an overhead product. These are returned to the unit 13 for further chlorination via line 27. The residue of the second distillation comprising ethyl dichlorobenzenes and ethyl trichlorobenzenes, together with minor amounts of relatively higher boiling impurities, is passed via line 28 to a third distillation unit 29 which is operated to yield as an overhead product ethyl dichlorobenzenes of the purity required for the side chain chlorination of the second stage of the process. Ethyl trichlorobenzenes and higher boiling essentially waste materials are discharged via line 30. This mixture may be worked for its ethyl trichlorobenzene content if desired.

The quantity of low boiling impurities separated in the first distillation unit is primarily dependent upon the purity of the ethyl benzene charged to the unit 13. We prefer to use an ethyl benzene of the highest practical purity in the execution of our invention. Chemically pure ethyl benzene, by our standards, has a boiling point of 136° C. and a refractive index between 1.4931 and 1.4933 at 25° C. over the entire range. It will not discolor concentrated sulfuric acid, will show a negative isatin test for thiophene and ethyl thiophenes and is free of benzene and polyethyl benzenes. While ethyl benzene of commercial quality may be employed according to the invention, it is advantageous to distill off the first 5% to remove the impurities such ethyl benzene usually contains.

The HCl recovered from the unit 13 and aeration or degasifying unit 20 is practically pure anhydrous HCl which can be used for any purpose, but we prefer to absorb it in water to form aqueous hydrochloric acid as indicated.

The method disclosed for separating the chlorination products is susceptible of considerable modification. Thus we may remove ethyl monochlorobenzenes as well as low boiling impurities in a first distillation and subsequently separate the low boiling impurities from the ethyl monochlorobenzenes in a second distillation. In such modification, the ethyl monochlorobenzenes are recovered as the bottom product of the second distillation and are recycled for further chlorination, while the ethyl dichlorobenzenes charged to the second stage of the process are produced by a third distillation in which the material distilled is the residue from the first distillation.

With regard to the equipment used in the distillations, we have found that steel kettles and columns are satisfactory. The condensers, however, should be enamel-lined or constructed of glass or an equivalent material. They can be constructed of steel only if operated at temperatures of 120° C. or above which avoids the condensation of aqueous HCl with consequent corrosion of the condensers. This aqueous HCl may be present due to inadvertent introduction of moisture into the system, as for example, with the air or other gas used in the degasification effected in the unit 20. The columns should contain the equivalent of at least 22 theoretical plates in order to obtain the requisite sharpness of separation. It has been found satisfactory to pack the columns with ½" carbon Raschig rings, but other suitable packing may be used. We generally employ reflux ratios within the range of 6:1 to 2:1, this ratio being defined as—volume of condensed overhead down column : volume of condensed overhead removed.

The composition of the product from the ring chlorination may vary within wide limits, but we preferably immediately halt the chlorination when trichloro compounds begin to be appreciable since these compounds represent unwanted by-products. In a typical run, the ring chlorination product may have, for example, the following composition:

| | Per cent |
|---|---|
| Ethyl monochlorobenzenes and low boiling products | 50 |
| Ethyl dichlorobenzenes | 45 |
| Ethyl trichlorobenzenes and higher boiling products | 5 |

In the distillations we naturally do not attempt a precise division. Thus, the material removed by the distillation in unit 24 may contain small amounts of ethyl monochlorobenzenes, while the material returned to the chlorination unit via line 27 may comprise minor amounts of ethyl dichlorobenzenes. Appreciable amounts of ethyl dichlorobenzenes may also be present in the residue from the distillation in unit 29.

As indicated by the drawing, it is our practice to take the overhead product of each of the stills according to a predetermined refractive index. If desired, the product of the ring chlorination may be subjected to a preliminary analytical distillation in order to determine the relative amounts or percentages of these fractions present. This information is advantageously used in fixing the ratio of overhead product to feed and other factors in the distillations.

*Second stage*

Ethyl dichlorobenzenes are conveyed from distillation unit 29 via line 31 and are charged together with chlorine and a side chain chlorination catalyst such as $PCl_3$ (lines 32 and 33 respectively) to chlorination unit 34. The chlorination in this unit is effected under the influence of light and at a temperature in the range of from 40 to 80° C. Heat may be supplied by passing the ethyl dichlorobenzenes through a heat exchanger, not indicated, interposed between distillation unit 29 and the chlorination unit.

Although the chlorination may be carried out in conventional equipment, we prefer to bubble the chlorine into the bottom of a glass column through which are circulated the ethyl dichlorobenzenes to be chlorinated. Light may be advantageously supplied from fluorescent lighting tubes positioned between the glass column and a reflecting outer jacket. In such method of effecting the chlorination, the chlorine is substantially completely consumed by the time it reaches the top of the column where the HCl formed in the chlorination is allowed to escape as a gas. In the drawing the HCl is passed through line 34a which connects with line 15 and is ultimately absorbed in unit 17.

A typical product from the side chain chlorination unit may be composed as follows:

| | Per cent |
|---|---|
| Low boiling materials | 0–3 |
| Ethyl dichlorobenzenes | 27–30 |
| Alpha and beta chloroethyl dichlorobenzenes | 57–60 |
| Higher boiling materials | 10–13 |

As has been previously stated, the ratio of alpha chloroethyl dichlorobenzenes to beta chloroethyl dichlorobenzenes in the product of the second chlorination is usually of the order of 5:2. This ratio, however, is in no way critical.

The side chain chlorination products are passed via line 35 to aeration or degasifying unit 36 for the removal of substantially the last traces of HCl. The necessary air is admitted to the degasifying unit via line 37, and air and HCl are withdrawn therefrom via line 38 connecting with line 15 as shown. The degasified products are next passed via line 39 to washer unit 40 wherein they are subjected to washing with caustic solution or water introduced via line 41 in order to free them of catalyst. The washing operation may be carried out, for example, either in a packed tower with the washing solution running countercurrently to the material being washed or in a stirred container. In the latter case particularly, care must be taken to avoid the formation of a stubborn emulsion of the organic material with the caustic soda solution or water. The wash liquor is led from the washer unit via line 41a, while the washed products are conveyed via line 42 to drying unit 43 in which the drying may be accomplished, for example, by passing the washed products through a bed of calcium oxide. It sometimes may be advantageous to pass the degasified products, which may contain considerable amounts of moisture as a consequence of the aeration, directly into the drying unit without prior washing.

The dried products are led from the drier 43 via line 44 to distillation unit 45 in which unit the chloroethyl dichlorobenzenes are separated from unreacted ethyl dichlorobenzenes and lower boiling materials. The residue of the distillation comprising the chloroethyl dichlorobenzenes is passed via line 46 to distillation unit 47, while the unreacted dichlorobenzenes are conveyed together with the low boiling materials via line 45a to distillation unit 24.

The distillation in unit 47 yields as an overhead product chloroethyl dichlorobenzenes suitable for dehydrochlorination according to the third stage of the process. The residue from this distillation unit is essentially waste material and is withdrawn via line 48.

Dichlorostyrenes at elevated temperatures are polymerized to produce resinous compounds which tend to plug a distilling column rendering it inoperative. It is important, therefore, to repress the formation of dichlorostyrenes during the distillations effected in units 45 and 47. To this end, the distillations should be carried out in the absence of common metals of construction such as steel, Phosphor bronze, etc., at the lowest feasible temperature with suitable additions of a suitable dehydrochlorination inhibitor (lines 44a and 46a in the drawing). Automatic feeding devices may be used for the addition of the inhibitor which may be added either to the feed or reflux or to both the feed and reflux. Compounds which tend to inhibit the conversion of chloroethyl dichlorobenzenes to dichlorostyrenes under the conditions of the distillations include the aromatic amines such as diphenyl amine, dimethyl aniline, etc., the nitroso phenols and their isomeric quinone oximes, e. g. alpha nitroso beta naphthol, quinone oxime, etc., and nitroso amines such as phenyl methyl N-nitrosoamine, N-nitroso piperidine, N-nitroso morpholine, and the like. Of these, we particularly prefer alpha nitroso beta naphthol. 0.1 part of this compound for each 100 parts of the material being distilled is usually sufficient. When operating with an inhibitor such as alpha nitroso beta naphthol, which is relatively non-volatile with respect to chloroethyl dichlorobenzenes, it is not our usual practice to work the final residue for its recovery but this may be done. If desired two inhibitors, one relatively volatile and one relatively non-volatile with respect to the chloroethyl dichlorobenzenes, may be used in the distillations. The nitroso amines above named represent examples of inhibitors which are more volatile than the chloroethyl dichlorobenzenes.

The ethyl dichlorobenzenes recycled to the first stage chlorination should be free of inhibitor. We usually effect the removal of inhibitor, when present, by washing with an alkaline or dilute acid solution, the choice of solution depending on the chemical nature of the inhibitor. In some cases it may be necessary to wash with both an alkaline and an acid solution.

So as to permit of the use of a low temperature in the distillations, the same must be conducted under vacuum or an inert diluent vapor, such as steam, must be used. In either event, the absolute pressure of the organic vapor preferably does not exceed 30 mm. of mercury at the top of the column. The kettle pressure where vacuum is used preferably does not exceed about 80 mm. of mercury.

Silver, unlike iron and Phosphor bronze, does not appear to catalyze conversion of chloroethyl dichlorobenzenes to dichlorostyrenes. For obvious reasons, however, we prefer to use glass or glass-lined apparatus in which the columns are preferably filled with a Stedman packing. Carbon or graphite Raschig rings may be used in the columns but these are less satisfactory. The pressed wire gauze of the Stedman packing is most suitably fashioned of silver or Monel metal.

We prefer to use continuous stills equipped with rapid recirculation reboilers heated indirectly with vapors of suitable condensing points but other means such as heating electrically may be used. In vacuum operation, we customarily produce the vacuum with two or more stages of sulfuric acid-sealed vacuum pumps. The columns used preferably contain the equivalent of about 22 theoretical plates and are preferably operated at a reflux ratio in the range of 6:1 to 2:1.

As indicated by the drawing, it is our practice to remove as the overhead product of the distillation effected in unit 45 material having an index of refraction below 1.5580. This material may, and preferably does contain from 2 to 5% chloroethyl dichlorobenzenes. The distillation in unit 47 is preferably so controlled that the material conveyed to the third stage of the process via line 49 has an index of refraction between 1.5580 and 1.5630.

We customarily determine the percentages of the above fractions present in the side chain chlorination product by a preliminary analytical distillation and control the operation of the distillation units accordingly. In the preliminary analytical distillations we use an analytical still containing the equivalent of from 25 to 30 theoretical plates.

Third stage

Alpha and beta chloroethyl dichlorobenzenes together with superheated steam are charged via line 50 to vaporizing unit 51 wherein the liquid chloroethyl dichlorobenzenes are converted to the vapor state. In the preferred method of effecting the vaporization, the chloroethyl dichlorobenzenes are atomized into the stream of superheated steam. A ratio of from about 2 to 10 parts by weight of steam to 1 part by weight of the liquid chloroethyl dichlorobenzenes may be used. A ratio of 5 or 6 to 1 with the steam heated to a temperature of about 600–650° C. has been found particularly advantageous.

The vapors from the unit 51 having a temperature of, for example, about 275° C. are admitted via line 52 to dehydrochlorinating unit 53 in which they are brought into contact with a catalyst such as silica gel which is preferably used in the form of granules of approximately 6 mesh size. Assuming a contact period of about 1 second, substantially all of the alpha chloroethyl dichlorobenzenes are dehydrochlorinated with little of the beta compound being affected. A temperature of 275° C. is not critical in the dehydrochlorination as somewhat higher or lower temperatures may be used. A suitable temperature range is from about 250° C. to about 350° C.

As the catalyst gradually picks up a deposit of carbon and tarry substances, after a time, usually 8 to 24 hours, it must be replaced or reactivated. This may be done by burning off the carbonaceous material with oxygen or an oxygen-containing gas such as air or with steam and oxygen at an elevated temperature of from 500° C. to 1000° C. Although the reactivation may be carried out in situ provided the reactor is constructed of materials which are not readily oxidized, we prefer to remove the catalyst and to reactivate it outside the reactor in a suitable apparatus such as a rotary kiln. If desired, a reactor may be used which comprises a plurality of tubes in which the catalyst is disposed. In such a reactor, catalyst in a portion of the tubes may be regenerated in situ while the other tubes remain in operation.

The vapors leaving the dehydrochlorinator 53 via line 54 are shock cooled in condensing unit 55 to a temperature preferably less than 30° C. The resulting condensate consisting of an immiscible mixture of water and the products of the dehydrochlorination is passed via line 56 to unit 57 in which unit the mixture separates into an upper layer consisting essentially of a very dilute aqueous solution of hydrochloric acid and a lower layer comprising the liquid dehydrochlorination products. The aqueous HCl solution, although of relatively little value, is passed via lines 58 and 59 to HCl absorber 17 while the lower layer containing usually from 60–75% dichlorostyrenes is passed via line 60 to distillation unit 61 after having been treated with an inhibitor admitted through line 62 adapted to prevent polymerization of the dichlorostyrenes in liquid phase. As the inhibitor, we prefer diamyl hydroquinone. 0.1 part of this compound for each 100 parts of the underflow from the unit 57 is usually sufficient.

In the distillation unit 61, dichlorostyrenes of the characteristics given in the forepart hereof are recovered as an overhead product, the distillation being effected at a low temperature in the manner of the distillations forming part of the second stage of the process. We prefer to conduct the distillation in such a way that as little as possible of the dichlorostyrenes reach the kettle of the still for reboiling. A typical operation would involve a kettle temperature of 150–160° C. at 40–60 mm. kettle pressure. In order to minimize polymerization of the dichlorostyrenes during the distillation, a suitable polymerization inhibitor should be used. The inhibitor, if relatively more volatile than the dichlorostyrenes, should be added to the distillation kettle. On the other hand, if it is relatively less volatile than the dichlorostyrenes it should be introduced near the top of the distillation column, for example, with the reflux condensate. If desired, the distillation may be carried out with additions of both types of inhibitors.

A highly effective inhibitor solution is prepared by dissolving up to 50% of dibenzyl hydroquinone in pure dichlorostyrenes and then adding 1 part of ditertiary butyl catechol for each 4 to 5 parts of dibenzyl hydroquinone. This solution is added to the reflux at the top of the column most suitably in such amounts that the reflux at that point contains at all times not less than 0.1% of the combined inhibitors. Para nitroso phenol and di-tertiary butyl hydroquinone are examples of inhibitors which are relatively more volatile than dichlorostyrenes and which are consequently best added to the still kettle. In the drawing, the inhibitor or inhibitor solution is introduced into distillation unit 61 via line 63, while the product dichlorostyrenes are withdrawn via line 64.

The residue from the distillation effected in unit 61 is passed via line 65 to distillation unit 66 for separation of tarry materials from unreacted chloroethyl dichlorobenzenes, chiefly beta chloroethyl dichlorobenzenes. The tarry materials which are separated as the bottom product of the distillation are withdrawn via line 67 while the chloroethyl dichlorobenzenes are passed via line 68 to a second dehydrochlorination unit 69 wherein they are dehydrochlorinated to yield additional amounts of dichlorostyrenes. Decomposition of the chloroethyl dichlorobenzenes during the distillation in unit 66 is avoided by addition through line 66a of a suitable amount. e. g. 0.1%, of diphenyl amine, for example.

The dehydrochlorination in the unit 69 is preferably effected with the aid of steam (line 70) as in the instance of the first dehydrochlorination. However, a considerably higher temperature is used in this second dehydrochlorination, e. g. 300 to 550° C., and instead of using silica gel as the catalyst, we prefer to use for example, a mixture of zinc, chromium, and cobalt or nickel silicates. The contact time depends principally upon the temperature employed but is usually within the range of 0.05 to 5 seconds.

The products of the second dehydrochlorination are best processed in the same manner as the products of the first. Thus the vapors are conducted via line 71 to condensing unit 72 wherein they are shock cooled to a temperature of preferably less than 30° C. Condensate from unit 72 is passed via line 73 to unit 74 in which two-layer separation occurs just as in unit 57. The upper layer consisting of dilute aqueous HCl is withdrawn via line 75 which connects with line 59 leading to the HCl absorption unit 17, while the lower layer after addition thereto through connection 76 of an inhibitor, such as diamyl hydroquinone, adapted to prevent the polymerization of dichlorostyrenes in liquid phase, is conveyed via line 77 to distillation unit 61. The use of a single still in the recovery of the dichlorostyrenes from the separate dehydrochlorination of the alpha and beta chloroethyl dichlorobenzenes possesses obvious advantages. We have not been able to detect any difference between the dichlorostyrenes produced by the dehydrochlorination of the alpha chloroethyl dichlorobenzenes and those produced by the dehydrochlorination of the beta ethyl dichlorobenzenes. If desired, unit 74 may be dispensed with and the condensate from unit 72 passed to unit 57.

Although the finished dichlorostyrenes usually contain inhibitor carried through the still, we prefer to add additional amounts of inhibitor if they are to be stored in liquid form at room temperature. By cooling to −10 to −20° C. or by freezing, the dichlorostyrenes direct from the still can be stored for long periods without danger of polymerization.

Various catalysts, other than those mentioned supra, have been found effective in the dehydrochlorination reactions. Thus the catalysts described in copending application Serial No. 457,194 filed September 3, 1942 are applicable. Still other catalysts which may be used include anhydrous calcium chloride, anhydrous calcium sulfate, mixed copper, manganese and cobalt silicates, and the like. The catalysts are advantageously used in granular form or applied superficially to carriers in this form. Carriers which may be used include alfrax or more porous media such as unglazed porcelain and the like. Such catalyst supports as well as reagents used in the preparation of the catalysts themselves should be relatively free of iron or other metals whose chlorides are sufficiently volatile to contaminate the product or have objectionable actions.

The dehydrochlorination reactions are endothermic and heat therefore must be continuously supplied. As has been indicated, we prefer to supply the heat directly by means of superheated steam, but other diluent gases such as nitrogen may be employed or the heat may be supplied indirectly by heating the walls of the catalyst chamber. The use of a diluent gas is preferred particularly if the reactions are to be carried out at atmospheric pressure because in this way the liquid feed can be more rapidly vaporized and decomposition and polymerization in the liquid phase minimized. The use of a diluent gas is further advantageous in that the active life of the catalyst is prolonged. We gauge the condition of the catalyst by the percentage conversion to dichlorostyrenes. When this falls to a predetermined minimum, the particular reactor or tube is withdrawn from operation and the catalyst subjected to reactivation treatment. The reactors used in the dehydrochlorinations are best constructed of nickel, ceramic, graphite or other materials which are inert with respect to the vapors being handled.

We claim:

1. In the production of dichlorostyrenes from a mixture of alpha and beta chloroethyl dichlorobenzenes prepared by chlorinating ethyl benzene first in the ring nucleus and then in the side chain, the improvement which comprises subjecting the mixture to a temperature within the range 250° C.–350° C. and to the action of an active dehydrochlorination catalyst whereby alpha chloroethyl dichlorobenzenes are converted in the presence of beta chloroethyl dichlorobenzenes to dichlorostyrenes, distilling the dichlorostyrenes from the reaction mixture, distilling beta chloroethyl dichlorobenzenes from the residue of the distillation, and subjecting the beta chloroethyl dichlorobenzenes to the action of an active dehydrochlorination catalyst at a temperature within the range 300° C.–550° C. and higher than the temperature to which the initial mixture is subjected, whereby a substantial portion of the beta chloroethyl dichlorobenzenes are converted to dichlorostyrenes.

2. A process according to claim 1 further characterized in that the chloroethyl dichlorobenzenes are passed into contact with the catalyst in the company of superheated steam, the steam serving as the source of heat necessary for the reaction.

3. A process which comprises subjecting a mixture of alpha and beta chloroethyl dichlorobenzenes to a temperature within the range 250°C.–350° C. and to the action of an active dehydrochlorination catalyst whereby alpha chloroethyl dichlorobenzenes are converted in the presence of beta chloroethyl dichlorobenzenes to dichlorostyrenes, distilling the dichlorostyrenes from the reaction mixture, distilling beta chloroethyl dichlorobenzenes from the residue of the distillation, and subjecting the beta chloroethyl dichlorobenzenes to the action of an active dehydrochlorination catalyst at a temperature within the range 300° C.–550° C. and higher than the temperature to which the initial mixture is subjected, whereby a substantial portion of the beta chloroethyl dichlorobenzenes are converted to dichlorostyrenes.

EDWIN R. ERICKSON.
JOHN C. MICHALEK.

REFERENCES CITED

The following references are of record in the file of this patent:

UNITED STATES PATENTS

| Number | Name | Date |
| --- | --- | --- |
| 2,193,823 | Levine et al. | Mar. 19, 1940 |
| 2,290,758 | Levine et al. | July 21, 1942 |
| 2,295,077 | Dreisbach et al. | Sept. 8, 1942 |
| 2,363,011 | Michalek et al. | Nov. 21, 1944 |

FOREIGN PATENTS

| Number | Country | Date |
| --- | --- | --- |
| 559,737 | Germany | Sept. 23, 1932 |